United States Patent [19]

Walton et al.

[11] Patent Number: 5,911,940
[45] Date of Patent: Jun. 15, 1999

[54] DUAL CURE PROCESS OF PRODUCING CROSSLINKED POLYOLEFINIC FOAMS WITH ENHANCED PHYSICAL PROPERTIES

[75] Inventors: Kim L. Walton, Lake Jackson; Seema V. Karande, Missouri City, both of Tex.

[73] Assignee: The Dow Chemical Company, Midland, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/927,932

[22] Filed: Sep. 11, 1997

Related U.S. Application Data

[63] Continuation of application No. 08/536,022, Sep. 29, 1995, abandoned.

[51] Int. Cl.⁶ .................................................. B29C 44/02
[52] U.S. Cl. .............................. 264/415; 264/51; 264/53; 264/54; 264/424; 264/425
[58] Field of Search ............................. 521/91; 264/415, 264/424, 425, 51, 53, 54

[56] References Cited

U.S. PATENT DOCUMENTS

| | | | |
|---|---|---|---|
| 3,098,831 | 7/1963 | Carr | 521/95 |
| 3,098,832 | 7/1963 | Pooley et al. | 521/95 |
| 3,646,155 | 2/1972 | Scott | 260/327 |
| 4,333,898 | 6/1982 | Schmidtchen | 264/45.9 |
| 4,446,254 | 5/1984 | Nakae et al. | 521/92 |
| 4,456,704 | 6/1984 | Fukumura et al. | 521/79 |
| 4,671,910 | 6/1987 | Fuhrmann | 264/54 |
| 4,702,868 | 10/1987 | Pontiff et al. | 264/50 |
| 4,762,860 | 8/1988 | Park | 521/88 |
| 4,870,111 | 9/1989 | Donuiff et al. | 521/60 |
| 5,266,627 | 11/1993 | Meverden et al. | 524/527 |
| 5,272,236 | 12/1993 | Lai et al. | 526/348.5 |
| 5,278,272 | 1/1994 | Lai et al. | 526/348.5 |
| 5,288,762 | 2/1994 | Park et al. | 521/79 |
| 5,340,840 | 8/1994 | Park et al. | 521/60 |
| 5,369,136 | 11/1994 | Park et al. | 521/143 |
| 5,380,810 | 1/1995 | Lai et al. | 526/352 |
| 5,387,620 | 2/1995 | Park et al. | 521/143 |
| 5,407,965 | 4/1995 | Park et al. | 521/81 |
| 5,492,760 | 2/1996 | Sarma et al. | 428/378 |
| 5,589,519 | 12/1996 | Knaus | 521/60 |
| 5,735,830 | 4/1998 | Fritz et al. | 604/280 |

FOREIGN PATENT DOCUMENTS

| | | |
|---|---|---|
| 0 125 436 | 11/1984 | European Pat. Off. . |
| 0 329 490 | 8/1989 | European Pat. Off. ............. 264/424 |
| 0 450 205 A1 | 10/1991 | European Pat. Off. . |
| 0646 622 A2 | 4/1995 | European Pat. Off. . |
| 3310295 | 9/1984 | Germany . |
| 53-026864 | 3/1978 | Japan . |
| 58-134131 | 8/1983 | Japan . |
| 59-230038 | 12/1984 | Japan . |
| 60-001237 | 1/1985 | Japan . |
| 95-309216 | 8/1985 | Japan . |
| 63-060733 | 3/1988 | Japan . |
| 63-175041 | 7/1988 | Japan ................................ 264/425 |
| 63-207833 | 8/1988 | Japan . |
| 2-80436 | 3/1990 | Japan ................................ 264/424 |
| 04013737 | 1/1992 | Japan . |
| 04278340 | 10/1992 | Japan . |
| 04312840 | 11/1992 | Japan . |
| 5-293870 | 11/1993 | Japan . |
| 7-207054 | 8/1995 | Japan . |
| 63159447 | 7/1998 | Japan . |
| 95/29197 | 11/1995 | WIPO . |

OTHER PUBLICATIONS

International Search Report completed on Feb. 13, 1997 in Application No. PCT/US96/14748.

Phillips, P.J., et al., Crosslinking of Homogeneous Polyethylenes, May 1–4, 1994, Society of Plastics Engineers Conference Proceedings. Volume II.

D. Klempner & K.C. Frisch, Handbook of Polymer Foams and Foam Technology, pp. 198–204, 205–208, & 382–402 Hanser Publishers, Munich, Vienna, New York, & Barcelona, Distibuted in the U.S. by Oxford University Press, New York, 1984.

*Primary Examiner*—Allan R. Kuhns

[57] ABSTRACT

Foamed articles having enhanced tensile, elastic recovery, and creep and fatigue resistance properties are prepared using a dual cure system. This system comprises a heat or radiation-activated first stage cure (which follows or coincides with foaming) followed by a moisture-activated second stage cure. Heat-activated curing systems include peroxide, sulfur, etc., and radiation-activated cure systems include electron beam, gamma-ray, etc. Moisture-activated systems include silane, sulfonyl chloride, and the like.

20 Claims, No Drawings

DUAL CURE PROCESS OF PRODUCING CROSSLINKED POLYOLEFINIC FOAMS WITH ENHANCED PHYSICAL PROPERTIES

This is a continuation of application Ser. No. 08/536,022, filed on Sep. 29, 1995, now abandoned.

BACKGROUND OF THE INVENTION

This invention relates to foams. In one aspect, this invention relates to crosslinked polyolefinic foams, particularly crosslinked ethylenic polymer foam structures, while in another aspect, the invention relates to a process for making such foams. In yet another aspect, the invention relates to a dual cure process for making crosslinked polyolefinic foams with enhanced physical properties.

Crosslinked foams, e.g. crosslinked polyolefinic foams, are used in a variety of applications where cushioning under high or dynamic loading is needed. These foams are usually manufactured using a chemical blowing agent, e.g. azodicarbonamide, in combination with crosslinking induced by peroxide decomposition or electron beam irradiation. When exposed to elevated temperature (>130° C.), the blowing agent decomposes into a gas, e.g. nitrogen, and the polyolefinic matrix is crosslinked simultaneously via peroxide decomposition. By achieving an optimum level of tensile properties at elevated temperatures by crosslinking, the decomposed gas is allowed to expand controllably to produce foams with desirable cell sizes. Crosslinking and blowing of the foam may be performed either sequentially or simultaneously. Very small cell size (about 100 $\mu$m diameter) foams are produced via simultaneous crosslinking and blowing agent decomposition under pressure as, for example, in compression or injection molding at elevated temperature. Very small cell size foams yield maximum cushioning from dynamic or high loading. Other foaming methods, e.g., extrusion, do not yield as small an average foam cell size and are not suitable for use in demanding cushioning applications such as foamed midsoles for athletic shoes, carpet underlay, cushioned vinyl flooring, gaskets, and the like. Foamed midsoles, in particular, require excellent creep and fatigue resistance, and hysteresis properties.

Several methods are known for crosslinking polyolefinic materials. Some common methods include the use of free radicals (e.g. peroxide and electron beam irradiation), sulfur cure, and moisture cure methods (e.g. those using silane grafted polyolefins or chlorosulphonated polyethylene). Crosslinking the polyolefinic matrix stabilizes the foam expansion process by increasing the extensional viscosity (melt strength) of the polymer and minimizing cell wall collapse. Furthermore, crosslinking enhances the physical properties (e.g. tensile strength, elastic recovery, creep, etc.) of the foamed article by establishing a molecular network within the polymer matrix. Higher levels of crosslinking result in higher tensile, elastic recovery, and creep properties. Fully crosslinked (100% gel as measured by ASTM D-2765-84) polyolefin-based foam structures would exhibit maximum tensile strength, elastic recovery and creep and fatigue resistance properties.

The crosslinking level, however, is typically restricted to 50–70% gel for optimum foam expansion. Optimally crosslinked foams utilize a sufficient amount of blowing agent to produce a foam to its minimum possible density without cellular collapse. Excessively crosslinked polyolefins restrict foam expansion during processing, yielding higher than desirable foam densities. As such, an upper crosslink or gel limit exists during the foam expansion process. Polyolefin-based foam compounds that have been crosslinked to 100% gel will not expand due to the very high elevated temperature tensile strength of the compound which restricts gas bubble expansion.

One potential method to further enhance the tensile, elastic recovery, and creep properties of the foamed article is post-expansion foam curing. Curing after foam expansion is not practical with peroxide or sulfur due to their consumption during the expansion process. Excessive peroxide or sulfur levels result in an excessive level of crosslinking which, in turn, interferes with the expansion process for the reasons already described. Mixed peroxides with different half-lives are also a possibility to further crosslink expanded foam, but this requires high oven temperatures to initiate the second-in-time peroxide. Such a process has limited utility in several finished article applications. Electron beam irradiation can also be used to further cure the foam but due to the high free surface-to-volume ratio of the foamed article, the polyolefinic foam oxidatively degrades when exposed to electron beam radiation.

One application, where superior fatigue and creep resistance properties are critical is a foamed midsole for an athletic shoe. Foamed midsoles provide a cushioning or impact absorbing characteristic to an athletic shoe. The typical useful life of a cushioning midsole is approximately 500 miles of running. With repeated wear of the shoe, the foamed midsole breaks down (the foam cells collapse) and the ability of the midsole to provide cushioning diminishes. The shoe in this condition is called a "dead" shoe. Wearing a "dead" shoe during high impact athletic activities such as running, walking or an aerobic workout can cause serious injury to ankle, knee, back or other parts of the body. Accordingly, athletic shoe manufacturers have a continuing interest in technology that can extend the useful life and cushioning ability of a midsole. Creep and fatigue resistance properties of a foamed midsole can predict the useful life of a shoe.

Another application where creep and fatigue resistance properties are critical is in cushioned vinyl flooring. Cushioned vinyl refers to the thin layer of foam on the underside of vinyl flooring. For this application, dynamic fatigue and static creep resistance are critical properties for enhanced performance and durability of the cushioned vinyl flooring.

SUMMARY OF THE INVENTION

According to this invention, the tensile, elastic recovery and creep and fatigue resistance properties of foamed articles are enhanced by using a dual cure system which uses a combination of heat- or radiation-activated curing, which itself precedes or coincides with foaming, followed by a moisture-activated cure. In one embodiment, the process comprises the steps of:

A. Compounding and simultaneously or subsequently shaping at least one olefinic polymer bearing pendent crosslinking functionality with at least one foaming agent and, optionally, at least one curing agent, to form a shaped, substantially uncrosslinked, foamed article precursor;

B. Performing a first stage cure on the precursor of Step A in such a manner that most of the pendent crosslinking functionality remains unreacted;

C. Simultaneously with or subsequently to the first stage cure of Step B, foaming the precursor of Step A to form a shaped, partially cured, foamed article; and D. Performing a second stage, moisture-activated cure of the pendent crosslinking functionality of the shaped, partially cured, foamed article of Step C.

In another embodiment, the process comprises the steps of:

A. Compounding under nongrafting conditions (i) at least one olefinic polymer, (ii) at least one moisture-activated, crosslinking functionality capable of being grafted to the olefinic polymer to form an olefinic polymer with pendent, moisture-activated crosslinking functionality, (iii) at least one free radical initiator, (iv) at least one foaming agent, and optionally (v) at least one curing agent to form a substantially homogeneous, uncrosslinked foamed article precursor;

B. Shaping the precursor of Step A under grafting conditions such that the free radical initiator is activated and a shaped, substantially uncrosslinked olefinic polymer with pendent, moisture-activated crosslinking functionality is formed;

C. Simultaneously with or subsequent to Step B, performing a first stage cure of the olefinic polymer with pendent, moisture-activated crosslinking functionality in such a manner that most of the pendent crosslinking functionality remains unreacted;

D. Simultaneously with or subsequently to the first stage cure of Step C, foaming the precursor of Step A to form a partially cured, foamed article; and E. Performing a second stage, moisture-activated cure of the pendent crosslinking functionality of the partially cured, foamed article of Step D.

As here used, "nongrafting conditions" means conditions, e.g. temperature, compounding time, shear, etc., at which the free radical initiator remains essentially inactive. As noted above, (i) the grafting and first stage cure steps, or (ii) the grafting, first stage cure and foaming steps, of the various embodiments of this invention can be performed either simultaneously or sequentially. However, whether simultaneous or sequential, these steps are performed in a manner that does not substantially activate the pendent crosslinking functionality.

The first stage, heat-activated cure includes peroxide, sulfur, epoxy and other known heat-activated curing agents, and the first stage, radiation-activated cure system includes electron beam, gamma-ray and other known radiation curing agents. Curing agents are also know by other names such as cure agent, cure activator, etc. Both of these cure mechanisms are performed under conditions such that most (i.e. greater than 50%), preferably substantially all (i.e. greater than 90%), of the pendent crosslinking functionality remains unreacted.

If the first stage curing agent is a heat-activated substance, e.g. a peroxide, sulfur, etc., then this activator is included in the compounding of Step A. If the first stage cure activator is a radiation source, e.g. electron beam, then obviously the activator is not included in the compounding of Step A but rather the mixture (i.e. foamed article precursor) formed in Step A is simply irradiated in any conventional manner to affect the first stage cure. Sulfur as a curing agent is, of course, used only with those olefinic polymers capable of being crosslinked with sulfur, e.g. those containing diene functionality, such as ethylene/propylene/diene terpolymer (EPDM). The various curing agents can be used alone or in combination with one another, e.g. two or more heat-activated curing agents, or two or more radiation sources, or one or more heat-activated curing agents and one or more radiation sources. Of course if more than one curing agent is used in the practice of this invention, then the agents are chosen, at least in part, for their compatibility not only with the other components of the system, but also with one another. One embodiment in which more than one curing agent may be used is that in which a peroxide is included in the mixture of Step A as the free radical initiator to effect the grafting of the crosslinker to the olefinic polymer. In this embodiment, excess or residual peroxide from the grafting may be available for initiating the first stage cure along with another curing agent, e.g. an epoxy, electron beam, etc.

The second stage, moisture-activated system includes those based on silane, sulfonyl chloride, and similar such agents.

Exemplary of the dual cure systems of this invention is a silane-grafted polyolefin prepared by reacting a vinyl silane with an olefinic polymer using at least about 200 parts per million (ppm) of peroxide. Due to the different curing mechanisms, a foamed article utilizing silane-grafted polyolefinic materials can be cured first by peroxide, either simultaneously or sequentially with the grafting step, if any, and blowing agent decomposition step, while leaving most, if not substantially all, of the silane crosslinking functionality unreacted. Subsequently the foamed article can be further cured through the grafted vinyl silane upon exposure to moisture at ambient and/or accelerated conditions. Under similar conditions, the resultant article exhibits enhanced tensile, elastic recovery, and creep and fatigue resistance properties (e.g. Table II reports creep resistance enhancement in excess of 25%, and Table IV reports fatigue resistance enhancement in excess of 50%), over a similar foamed article containing the same polyolefinic material but void of silane grafting. This superior fatigue property makes these foamed articles useful in dynamic cushioning applications such as midsoles for athletic shoes, carpet underlay, cushioned vinyl flooring, gaskets, and the like.

DESCRIPTION OF THE PREFERRED EMBODIMENTS

Any olefinic polymer that is curable by heat or radiation, is capable of grafting with silane or a similar compound that is subsequently curable upon exposure to moisture, and has a relatively high (e.g. >0.2 g-mil/100 in$^2$-day-atm) water vapor transmission rate (WVTR) can be used in the practice of this invention. These polymers include, but are not limited to, linear and substantially linear ethylene/($\alpha$-olefin copolymers such as ethylene/1-propene, ethylene/1-butene, ethylene/1-hexene, ethylene/1-octene; ethylene polymers and copolymers manufactured by high pressure, free radical polymerization such as low density polyethylene (LDPE), ethylene/vinyl acetate (EVA), ethylene/methacrylate, ethylene/acrylic acid (EAA); and diene containing polymers such as ethylene/propylene/norborene, butyl rubber; and the like. Preferred polymers are those with the higher WVTRs (e.g. >1, preferably >2, g-mil/100 in$^2$-day-atm) since these are particularly well suited for fast moisture-induced post-foaming cure.

While olefinic polymers having a high level of tertiary hydrogens and an unsaturated backbone, e.g. butyl rubber, can be used in the practice of this invention, these polymers are generally limited to those applications in which the first stage cure is affected by the heat-activation of sulfur. Olefinic polymers with high levels of tertiary hydrogens and a saturated backbone, e.g. polypropylene, can also be used in the practice of this invention, but only as a component in a blend of olefinic polymers because free radical reactions result in chain scission of such polymers. In such blends, these scission-prone polymers generally do not exceed about 50 wt %, based upon the total weight of the polymer blend, and preferably they do not exceed about 25 wt %.

Preferred olefinic polymers for the production of the foam structures of this invention include linear high density polyethylene (HDPE), linear low density polyethylene (LLDPE) (e.g., Dowlex™ made by The Dow Chemical Company), ultra low linear density polyethylene (ULDPE) (e.g. Attane™ made by The Dow Chemical Company), etc., homogeneously branched, linear ethylene/x-olefin copolymers (e.g. Tafmer™ by Mitsui PetroChemicals Company Limited and Exact™ by Exxon Chemical Company), homogeneously branched, substantially linear ethylene/α-olefin polymers (e.g. the Affinity™ and Engage™ polymers manufactured by The Dow Chemical Company), and high pressure, free radical polymerized ethylene copolymers such as EAA (e.g. the Primacor™ polymers manufactured by The Dow Chemical Company) and EVA (e.g. the Escorene™ polymers manufactured by Exxon Chemical Company, and the Elvax™ polymers manufactured bu E. I. du Pont de Nemours & Co.). The more preferred olefinic polymers are the homogeneously branched linear and substantially linear ethylene copolymers with a density (measured in accordance with ASTM D-792) from about 0.85 to about 0.92 g/cm$^3$, especially from about 0.85 to about 0.90 g/cm$^3$ and a melt index (measured in accordance with ASTM D-1238 (190/2.16)) from about 0.1 to about 10 g/10 minutes; the substantially linear ethylene copolymers and the various functionalized ethylene copolymers such as EVA (containing from about 0.5 to about 50 wt % units derived from vinyl acetate) are especially preferred, especially EVA polymers having a melt index (ASTM D-1238 (190/2.16) from about 0.1 to about 10 g/10 minutes; EAA (containing from about 0.5 to about 25 wt % units derived from acrylic acid) and similar ethylenically unsaturated carboxylic acid containing polymers are also useful in the present invention.

The substantially linear ethylene polymers are characterized by narrow molecular weight distribution (MWD) and narrow short chain branching distribution (SCBD), and these polymers yield foam structures with outstanding tensile, tear and hysteresis properties. These substantially linear ethylene polymers are more fully described in U.S. Pat. Nos. 5,272,236, 5,278,272 and 5,380,810, all of which are incorporated herein by reference. Crosslinked foams made from these polymers are more fully described in U.S. Pat. Nos. 5,288,762, 5,387,620 and 5,407,965, all of which are incorporated herein by reference, and extruded foams made from these polymers are more fully described in U.S. Pat. Nos. 5,340,840 and 5,369,136, both of which are incorporated herein by reference. These substantially linear polymers exhibit outstanding physical properties by virtue of their narrow MWD and narrow SCBD coupled with long chain branching (LCB). The presence of LCB in these olefinic polymers allows for easier processing (faster mixing, faster processing rates) and allows for more efficient free radical crosslinking. The utility of simple peroxide crosslinked foam structures based on these substantially linear ethylene polymers has been demonstrated in U.S. Pat. Nos. 5,288,762 and 5,340,840.

Blends of various polymers, particularly olefinic polymers, can be formulated to produced suitable foam structures. Such blends include, but are not limited to, substantially linear poly(ethylene-co-1-octene)/substantially linear poly(ethylene-co-1-propene) blends, etc., linear poly(ethylene-co-1-octene)/substantially linear poly(ethylene-co-1-butene) blends, etc., linear poly(ethylene-co-1-octene)/linear poly(ethylene-co-1-hexene) blends, etc., substantially linear poly(ethylene-co1-octene)/poly(ethylene-co-vinylacetate) blends, etc., and linear poly(ethylene-co-1-octene)/poly(ethylene-co-vinylacetate) blends, etc. These blends can also contain, as noted previously, minority amounts (<50 wt % based on the weight of the blend) of scission-prone polymers, e.g. polypropylene.

The foaming (i.e. blowing) agents useful in this invention include physical and chemical blowing agents. Suitable chemical blowing agents include exothermic chemical blowing agents such as azodicarbonamide, azodiisobutyronitrile, 4,4-oxybenzene sulfonylsemicarbazide, p-toluene sulfonylsemicarbazide, and the like, or endothermic chemical blowing agents such as sodium bicarbonate, both of which induce foaming by decomposing into a gas upon heating. These agents are preferably in solid form so that they may be easily dry-blended with the olefinic polymer. Mixtures of chemical blowing agents may also be used. Additional teachings regarding chemical blowing agents are found in the *Handbook of Polymer Foams and Technology*, pp. 205–208 and pp. 382–402, edited by D. Klempner and K. C. Frisch, Hanser Publishers, Munich, Vienna, New York, Barcelona (1991).

Chemical blowing agents are usually blended with the olefinic polymer in an amount sufficient to evolve about 0.2 to about 5, preferably from about 0.5 to about 3, and more preferably from about 1 to about 2.5, moles of gas or vapor per kilogram of polymer.

Physical blowing agents, and mixtures of physical blowing agents, include volatile organic liquids and gases such as aliphatic hydrocarbons of 1–9 carbon atoms, aliphatic alcohols of 1–3 carbon atoms, and fully and partially halogenated aliphatic hydrocarbons of 1–4 carbon atoms. Representative of these organic physical blowing agents are butane, xylene, toluene, carbon tetrachloride and chlorofluorcarbons. Inorganic physical blowing agents include the elemental gases such as nitrogen, argon, helium, hydrogen, and carbon dioxide. These physical blowing agents are typically blended with the olefinic polymer in proportions similar to the chemical blowing agents.

Suitable crosslinking agents include free radical initiators, preferably organic peroxides, more preferably those with one hour half lives at temperatures greater than 120° C. Examples of useful organic peroxides include 1,1-di-t-butyl peroxy-3,3,5-trimethylcyclohexane, dicumyl peroxide, 2,5-dimethyl-2,5-di(t-butyl peroxy) hexane, t-butyl-cumyl peroxide, di-t-butyl peroxide, and 2,5-dimethyl-2,5-di-(t-butyl peroxy)hexyne. Dicumyl peroxide is the preferred agent. Additional teachings regarding organic peroxide crosslinking agents are available in the *Handbook of Polymer Foams and Technology*, pp. 198–204, supra.

Free radical crosslinking initiation via electron beam, or beta-ray, gamma-ray, x-ray or neutron rays may also be employed. Radiation is believed to affect crosslinking by generating polymer radicals, which may combine and crosslink. The *Handbook of Polymer Foams and Technology*, supra, at pp. 198–204, provides additional teachings.

Elemental sulfur may be used as a crosslinking agent for diene containing polymers such as EPDM and polybutadiene.

Other components that can be added to the foam mixture include fillers such as calcium carbonate, talc, clay, magnesium carbonate, mica, and the like; foaming agent activators including salts of transition metals (especially those of lead, cadmium and zinc) polyols, urea, alcohol amines and organic acids. Zinc oxide and zinc stearate are preferred. Free radical crosslinking coagents, i.e. promotors or co-initiators, include multifunctional vinyl monomers and polymers, triallyl cyanurate and trimethylolpropane trimethacrylate, divinyl benzene, acrylates and methacrylates of polyols, allyl alcohol derivatives, and low molecular weight polybutadiene. Sulfur crosslinking promotors include benzothiazyl disulfide, 2-mercaptobenzothiazole, copper dimethyldithiocarbamate, dipentamthylene thiuram tetrasulfide, tetrabutylthiuram disulfide, tetramethylthiruam disulfide and tetramethylthiuram monosulfide. Pigments include carbon black, titanium dioxide, cadmium-based or other inorganic or organic based pigments. Foam nucleators include talc, silicon dioxide, titanium dioxide, and clay. Antioxidants e.g. phenolic, phosphitic, etc., can also be included to enhance the shelf-life of the finished article. Process aids such as low molecular weight polyethylene waxes, ester waxes, paraffin wax, paraffin oils, mineral oils, napthenic oils, bisteramides, stearamides, calcium stearate, and stearic acid can also be used. Other additives, e.g. ultraviolet absorbers, flame retardants, etc., can also be included in the polymer mix.

Finished articles can be manufactured by many different processes, and these processes include compression molding, injection molding, extrusion, electron beam curing, vertical and horizontal oven expansion, oven-curing, and the like. These processes can be used alone or in combination and if used in combination, these processes can be used sequentially or simultaneously depending, of course, on the compatibility of one process with another. All of these processes share the following common procedure:

compounding the formulation forming, i.e. shaping, the formulation into a preformed shape heat or radiation curing of the preformed shape foaming post-foaming moisture cure The formulation can be compounded with an olefinic polymer grafted with crosslinking functionality, or it can be compounded with an ungrafted olefinic polymer and a crosslinking compound and then the latter can be grafted to the former during the shaping step. The compounding and shaping steps can be performed sequentially (compounding first) or simultaneously, e.g. separately compounding the components followed by compression or injection molding, or compounding and shaping with a reactor extruder, respectively. Likewise, the heat or radiation curing step and the foaming step can be performed sequentially (curing first) or simultaneously. Preferably, the curing agents of the first cure are chosen so as to shield the curing agents of the second cure from early activation, i.e. from activation before foaming is complete. Since the curing agents of the second cure are activated by moisture, i.e. water vapor, preferably the foaming and first cure steps are performed in such a manner that water vapor is not generated as a byproduct. In this regard, hydrazines and aluminum trihydrate are disfavored as first stage chemical blowing agents, water is disfavored as a physical blowing agent, and anhydrous fillers are preferred.

The process of making olefinic, particularly ethylenic, foam structures is described in detail the *Handbook of Polymer Foams and Technology*, Chapter 9, supra.

Any pendent crosslinking functionality (i.e. a crosslinking functionality that is grafted or attached to the polymer backbone), preferably a silane, that will effectively crosslink the olefinic polymer can be used in the practice of this invention. Crosslinking functionalities include the various silanes, sulfonyl chloride, and the like. Preferred silanes are the unsaturated alkoxy silanes which can either be grafted onto the polymer or incorporated into the polymer by direct copolymerization. These silanes and their method of preparation are more fully described in U.S. Pat. No. 5,266,627 to Meverden, et al., which is incorporated herein in its entirety by reference. Silanes with three or more alkoxy groups are preferred, and illustrative of these preferred silanes are vinyl trimethoxy silane, vinyl triethoxy silane, and mixtures of silanes containing at least one of these two compounds.

The amount of crosslinker for grafting to the olefinic polymer used in the practice of this invention can vary widely depending upon the nature of the olefinic polymer, the crosslinker, the processing conditions, the grafting efficiency, the ultimate application, and similar factors, but with silane crosslinkers, typically at least about 0.5, preferably at least about 0.7, parts per hundred resin (phr) is used. Considerations of convenience and economy are usually the two principal limitations on the maximum amount of crosslinker that can be used in the practice of this invention, and typically the maximum amount of silane crosslinker does not exceed about 5, preferably it does not exceed about 2, phr. As used in parts per hundred resin or phr, "resin" means the olefinic polymer, either a single polymer or a mixture of polymers.

The crosslinker is grafted to the olefinic polymer by any conventional method, typically in the presence of a free radical initiator such as any one of the peroxide initiators, e.g. dicumyl peroxide, t-butyl perbenzoate, benzoyl peroxide, cumene hydroperoxide, t-butyl peroctoate, methyl ethyl ketone peroxide, and the like. The amount of initiator will vary with a host of factors, e.g. the crosslinker, the nature of the initiator, the presence or absence of a co-agent such as triallyl cyanurate, the properties of the grafted olefinic polymer ( particularly its melt index (M.I.)), and the like. For a silane-grafted olefinic polymer with a M.I. from about 1 to about 5 and with dicumyl peroxide as the initiator in combination with a like amount of triallyl cyanurate as the co-agent, the typical minimum amount of initiator present is at least about 0.02, preferably at least about 0.06, phr. Typically, under these circumstances, the maximum amount of initiator does not exceed about 2, preferably it does not exceed about 1, phr. If a co-agent is not present, then the typical minimum amount of initiator is at least about 0.5, preferably at least about 1.5, phr, and the typical maximum amount does not exceed about 4, preferably it does not exceed about 2, phr. First stage cure systems that include a co-agent are preferred. If a peroxide is the cure activator for the first stage cure, then an amount in excess of the above typical maximums can be present during the grafting step such that the excess is available for activating the first stage cure. This is a preferred embodiment in those circumstances in which the grafting and first stage cure steps are performed simultaneously.

While any conventional method can be used to graft the silane crosslinker to the olefinic polymer, one preferred method is blending the two with the initiator in the first stage of a reactor extruder, such as a Buss kneader. The grafting conditions can vary, but the melt temperatures are typically between about 160 and 260, preferably between about 190 and about 230° C., depending upon the nature of the olefinic polymer, the residence time in the kneader, the half life of the initiator, and similar factors.

The foam structures of this invention are prepared by any one of a number of different embodiments of the process of this invention. In one embodiment, the crosslinker is grafted to the polymer, and the grafted polymer is then shaped, foamed and free radical crosslinked essentially simultaneously. In another embodiment, the polymer is grafted with a crosslinker in a step separate and apart from the shaping, foaming and free radical crosslinking steps. In yet other embodiments, the foaming and free radical crosslinking steps of the first two embodiments are separate from one another.

As an example of the first embodiment, olefinic polymer, blowing agent, peroxide, silane, and other components (e.g. blowing agent activators such as ZnO, ZnSt, etc.; co-agents such as triallyl cyanurate; fillers; antioxidants; pigments; catalysts for silane cure, e.g. dibutyltin dilaurate, stannous octoate, lead octoate and tetra-isopropyl titanate) are added to any suitable mixing device. These components are then mixed at a temperature below the decomposition temperature of the blowing agent and below the activation or "kick-off" temperature of the peroxide to ensure that the silane is not grafted to the polymer before all the components are homogeneously dispersed within the polymer. Once the components are relatively homogeneously dispersed within the polymer, the resulting mix is shaped and then exposed to conditions (e.g. heat, pressure, shear, etc.) over a sufficient period of time such that the peroxide is activated and the blowing agent is decomposed. These conditions are usually sufficient to graft the silane to the polymer too. After the grafting, first stage cure and foaming are complete, additional cure is achieved by exposing the foamed article to sufficient moisture to activate silane crosslinking. This will occur under ambient conditions naturally over time (e.g. 1–4 weeks), or it can be accelerated by exposing the foamed article to elevated humidity and temperature, e.g. a curing sauna.

As an example of the second embodiment, the olefinic polymer is first grafted with a silane crosslinker as described above in a step separate and apart from the blowing agent, peroxide initiator, and other components of the process. After the polymer is grafted with the silane, it is admixed with the other components to form a relatively homogeneous blend and the blend is then shaped and exposed to conditions under which the blowing agent is decomposed and the peroxide initiator activated. The resulting foamed article is then further cured by silane crosslinking as previously described.

The effect of the presence or absence of water in the process of this invention will vary with the process particulars. The presence of water is important in the context of activating the silane cure process. If substantial water is present during the shaping, first stage cure, foaming and/or silane grafting, then the silane may begin to crosslink prematurely to the ultimate detriment of the foamed article properties. However, if the kinetics of the silane crosslinking (or any other moisture-activated crosslinker) are relatively slow, then the presence of water during the shaping, first stage cure, foaming and/or silane grafting are relatively unimportant to the final properties of the foamed article. Alternatively, if these kinetics are relatively fast, then the presence of water during these early steps of the process can prove detrimental to the final properties of the foamed article and as such, the presence of water is best excluded or minimized during these early steps.

The silane-crosslinked foamed structures produced by the dual cure process of this invention have an ultimate gel level of 90–100% (as determined by ASTM D-2765-84). The gel level of the structure after the heat or radiation cure but prior to the moisture cure is typically from about 5 to about 90% gel, preferably from about 30 to about 70% gel. The second stage cure, i.e. the silane moisture-induced cure, usually takes 1 to 4 weeks to complete under ambient conditions. Of course, the cure can be accelerated, as noted above, by exposing the foam to high humidity conditions, such as a curing sauna. The rate of the second stage cure can be controlled through the combination of vinyl silane selection and the presence or absence of a cure accelerator, such as dibutyltin dilaurate. Over time, the foamed structure may actually crosslink beyond the measuring capability of the gel test.

The foamed structures produced by the process of this invention typically have a foam density of less than about 500, preferably less than about 250, and most preferably from about 10 to about 150 kg/m$^3$. The foam has an average cell size of from about 0.05 to about 5, more preferably from about 0.1 to about 2, and most preferably from about 0.2 to about 1 mm which is measured in accordance with ASTM D-3576.

The following examples are illustrative of certain specific embodiments of this invention. Unless otherwise noted, all parts and percentages are by weight.

SPECIFIC EMBODIMENTS

Creep is a measure of resistance to flow under a constant static load. Examples of static loads include the load on shoes when a person stands for an extended period of time, and the load experienced by shoes under their own weight and at elevated temperatures such as those frequently experienced during shipment by sea or warehouse storage. Minimizing the permanent deformation (or static compression set) after a constant static load for an extended period will give foamed midsoles an improved performance. The measurement of creep resistance performance can be accelerated by conducting the static compression set experiments at elevated temperatures.

Fatigue resistance is the permanent deformation of a foam measured after cyclic loading and unloading. If the cyclic loading and unloading is done under conditions that simulate running, then the permanent deformation (or dynamic compression set) of the foam can be a direct measure of the useful life of a shoe midsole. Measurement of hysteresis during cyclic loading and unloading is also a measure of permanent deformation of the foam. Hysteresis is a measure of energy dissipated by the foam during cyclic loading and unloading. The dissipated energy causes a temperature rise and accelerates the permanent deformation of the foamed midsole. Accordingly, minimizing hysteresis and permanent deformation (for both dynamic and static loadings) is important to improving the fatigue resistance and to extend the useful life of a foamed midsole.

Formulations 1–5 (Table I) were individually prepared in a Banbury size BR internal batch mixer, and the mixing was accomplished using a 80% load factor. Each formulation was mixed to a drop temperature of between 95–110° C. for 4–5 minutes. This temperature range is below the decomposition temperature of the peroxide and the azodicarbonamide blowing agent. The formulations were then sheeted off on a roll mill heated to 80° C. into one-quarter to one-half inch thick slabs. Each formulation is described in Table I, and the only variables in these formulations are the levels of filler and silane.

TABLE I

| Component (phr)[1] | FORMULATIONS 1–5 | | | | |
|---|---|---|---|---|---|
| | 1 | 2 | 3 | 4 | 5 |
| Olefinic Polymer[2] | 100 | 100 | 100 | 100 | 100 |
| Foaming Agent[3] | 4.5 | 4.5 | 4.5 | 4.5 | 4.5 |
| Foaming Agent Activator[4] | 1.35 | 1.35 | 1.35 | 1.35 | 1.35 |
| Peroxide[5] | 2 | 2 | 2 | 2 | 2 |
| Coagent[6] | 2.5 | 2.5 | 2.5 | 2.5 | 2.5 |
| Antioxidant[7] | 0.1 | 0.1 | 0.1 | 0.1 | 0.1 |
| Filler[8] | 5 | 5 | 5 | 15 | 15 |
| Silane[9] | 0 | 2 | 4 | 2 | 4 |
| Pigment 1[10] | 3 | 3 | 3 | 3 | 3 |

TABLE I-continued

FORMULATIONS 1–5

| Component (phr)[1] | 1 | 2 | 3 | 4 | 5 |
|---|---|---|---|---|---|
| Pigment 2[11] | 0.01 | 0.01 | 0.01 | 0.01 | 0.01 |

[1] Parts per hundred resin
[2] Engage ™ EG 8200, an ethylene/1-octene substantially linear homogeneous ethylene copolymer with a density of 0.870 g/cc and an $I_2$ of 5 g/10 min (ASTM D-1238, Condition 190/216) manufactured by The Dow Chemical Company.
[3] Celogen ™ AZNP 130, an azodicarbonamide available from Uniroyal Chemical Company
[4] Kadox ™ 911, a zinc oxide blowing agent activator available from C. P. Hall
[5] DiCup ™ 40 KE, 40% active dicumyl peroxide on clay available from Hercules Corporation
[6] Sartomer ™ 350 Monomer, a trimethylolpropane trimethacrylate crosslinking coagent available from Sartomer Company
[7] Irganox ™ 1010, an antioxidant available from Ciba Geigy Corporation
[8] Magcarb ™ L, a magnesium carbonate available from C. P. Hall
[9] Vinyl trimethoxy silane (VTMS), 98% active, available from Aldrich Chemical Company
[10] TiONA ™ RCL-4, a rutile chloride process titanium dioxide available from SCM Chemicals.
[11] Ultra Marine Blue, a sodium alumino sulphosilicate available from Whittaker, Clark and Daniels, Inc.

Foams were prepared from Formulations 1–5 under two different conditions. In condition 1, the roll milled sheet was cut into approximately 5"×5" squares and scraps. Approximately 200 g of these cut pieces were then placed into a chase with an opening of approximately 5"×5"×0.5". The material was then foamed at temperatures ranging from 150 to 160° C., at 25 tons of pressure and for times ranging from 40 to 50 minutes. A Carver auto-hydraullic hot press, model 3895, was used to prepare the foams. These conditions are optimized for the foaming of these particular formulations.

Under condition 2, the roll milled sheet was also cut into approximately 5"×5" squares and scraps. Again, about 200 g of these squares and scraps were placed into a chase with an opening of 5"×5"×0.5". The material was placed in a Tetrahedron MTP-8 compression press at 100° C. for 20 minutes at 1 ton pressure, then immediately taken to Carver auto-hydraullic press (model 3895) at 175° C. and kept at that temperature for 8 minutes at 25 tons of pressure to crosslink the polymer and decompose the blowing agent.

For both conditions, the foamed formulations with VTMS were moisture cured in a water bath at 40° C. for three to four days.

All the samples were measured for density and static compression set. The foam density was measured by first cutting the foam into 1.5×1.5 inch squares. The skin of the foam was removed and the sample thickness was adjusted to 0.5 inches using a Hobart slicer. The length, width and thickness of the sample were accurately measured using calipers. These values were then used to find the volume of the sample, and the mass was obtained by simply weighing the sample on a scale. The density was then calculated using the equation density=mass/volume The static compression set was determined by first measuring the initial thickness of the sample using calipers. These samples were then compressed 50% using 0.25 inch spacers in a static compression set jig as described in ASTM D-395 Method B. The compression set was then measured at two different conditions as follows:

Compression Set Condition 1: 60° C. for 3 hours, 50% compression, 30 minute recovery time Compression Set Condition 2: 21° C. for 22 hours, 50% compression, 30 minutes recovery time For the static compression for Condition 1, the jig with the samples was placed in an oven heated to 60° C. for 3 hours, the jig was then removed from the oven and the samples removed from the jig, and the samples were then allowed to relax for 30 minutes before the final thicknesses were measured.

For the static compression set for Condition 2, the jig with the samples was placed at ambient conditions (21° C.) for 22 hours, the samples were removed from the jig, and then the samples were allowed to relax for 30 mintues before the final thicknesses were measured.

The static compression set for both the conditions was calculated using the following equation:

Percent Static Compression Set=$[(T_o-T_f)/(T_o-T_s)]$ in which $T_o$=Original sample thickness
$T_f$=Final sample thickness
$T_s$=Spacer thickness The foam densities and the percent static compression set (an average of 4 trials per sample) are reported in Tables II and III.

TABLE II

FOAM DENSITIES AND PERCENT STATIC COMPRESSION SET OF SAMPLES A–E PREPARED UNDER FOAM CONDITION 1*

| | A | B | C | D | E |
|---|---|---|---|---|---|
| Description | No Silane | w/ 2 phr Silane, 5 phr MgCO$_3$ | w/ 4 phr Silane, 5 phr MgCO$_3$ | w/ 2 phr Silane, 15 phr MgCO$_3$ | w/ 4 phr Silane, 15 phr MgCO$_3$ |
| Foam Density (lb/ft$^3$) | 12.0 ± 0.5 | 17.2 ± 0.6 | 20.1 ± 1.0 | 17.5 ± 0.2 | 22.7 ± 0.2 |
| Static Compression Set (%) Condition 1** | 81.5 ± 2.1 | 66.1 ± 1.1 | 55.3 ± 2.4 | 55.1 ± 3.1 | 53.8 ± 2.1 |
| Static Compression Set (%) Condition 2± | 63.3 ± 2.4 | 38.4 ± 2.0 | 27.4 ± 2.1 | 34.9 ± 3.0 | 27.2 ± 1.7 |

*Foam condition 1 = 150–160 C. for 40–50 min, 25 tons pressure
**Static Compression Set Condition 1 = 60 C., 3 hours, 50% compression, 30 minute recovery
±Static Compression Set Condition 2 = 21 C., 22 hours, 50% compression, 30 minute recovery

TABLE III

FOAM DENSITIES AND PERCENT STATIC COMPRESSION SET OF SAMPLES F–H PREPARED UNDER FOAM CONDITION 2*

| | F | G | H |
|---|---|---|---|
| Description | No Silane | w/ 2 phr Silane, 5 phr MgCO$_3$ | w/4 phr Silane, 5 phr MgCO$_3$ |
| Foam Density (lb/ft$^3$) | 9.1 ± 0.1 | 11.3 ± 0.2 | 12.8 ± 0.3 |
| Static Compression Set (%) Condition 1** | 88.7 ± 2.3 | 74.6 ± 2.2 | 68.9 ± 1.3 |
| Static Compression Set (%) Condition 2± | 58.5 ± 2.3 | 36.8 ± 1.4 | 20.5 ± 1.9 |

*Foam condition 2 = 100 C. and 1 ton pressure for 20 min., then 175 C. and 25 tons pressure for 8 min.
**Static Compression Set Condition 1 = 60 C., 3 hours, 50% compression, 30 minute recovery
±Static Compression Set Condition 2 = 21 C., 22 hours, 50% compression, 30 minute recovery As seen from the data in Tables II and III, the static compression set of the foams produced with a dual cure system (Examples B, C, D, E, G and H) is lower than the static compression set of the foams produced with a single cure system (Comparative Examples A and F). This trend is observed for both the ambient condition (21° C.) and elevated temperature (60° C.) samples. Again, static compression set is a measure of better creep resistance, and the lower the static compression set reading, the better the creep resistance.

Foams I and J (Table IV) produced with formulations 1 and 2 (see Table I) were also tested for dynamic set performance. Dynamic compression set is a measure of the elastic recovery of a foam subjected to cyclic deformation. The foams were produced using both foam preparation conditions 1 and 2 (see the * footnotes to Tables II and III).

As noted earlier, in the athletic footwear industry the useful life of a cushioning system (midsoles) is assumed to be approximately 500 miles of running. The test method designed for this study simulates the loading cycles experienced by the shoe cushioning system. In the test method used in this study post-fatigue percent compression set or dynamic compression set was measured. The test was run at a constant compressive load amplitude of 4 Hz sinusoidal fatigue from 5 psi to 75 psi for 20,000 cycles.

Testing was conducted on an MTS 831 Elastomer servo hydraulic test frame. This system has a capability of up to 1500 lb loading, 4 inches displacement, and 300 Hz frequency. The load was monitored using an MTS Model 661.19C, SN 44108, 2000 lb capacity load cell, operating on a 500 lb full scale range. The displacement full scale during testing was 2 inches. MTS Model 682.01A lightweight 3 inch diameter, 3300 lb rated compression platens was also used.

The dynamic compression set was calculated as follows:

$$\text{Dynamic compression set} = ((T_o - T_f)/T_o) * 100$$

in which $T_o$=Sample thickness before the fatigue test $T_f$=Sample thickness measured 30 minutes after the fatigue test was complete.

This approach of measuring compression set is based on ASTM D-395 compression test method A (compression test under constant force). The dynamic compression set and the foam density (measured as previously described) are reported in Table IV.

TABLE IV

FOAM DENSITIES AND PERCENT DYNAMIC COMPRESSION SET OF FOAM SAMPLES I AND J PREPARED WITH FORMULATIONS 1 AND 2 UNDER FOAM CONDITIONS 1 AND 2

|  | I* | J** |
|---|---|---|
| Description | No Silane | w/ 2 phr Silane, 5 phr $MgCO_3$ |
| Foam Density (lb/ft$^3$) | 24.0 ± 0.5 | 24.1 ± 0.3 |
| Dynamic Compression Set (%) | 11.7 ± 0.8 | 5.5 ± 0.5 |

*Foam condition 1 = 150–160 C. for 40–50 min, 25 tons pressure
**Foam condition 2 = 100 C. and 1 ton pressure for 20 min., then 175 C. and 25 tons pressure for 8 min.

Dynamic compression set is lower for foams produced with a dual cure system (Example J) than for foams produced with a single cure system (Example I), and this demonstrates that dual cured foams have better fatigue resistance than single cured foams.

The static compression set was also measured on foams prepared from two formulations in which the olefinic polymer was grafted with silane before the foam formulation itself was prepared. In these examples, the polymers (Engage™ EG 8200, see footnote 2 to Table I) were grafted with VTMS (see footnote 9 to Table 1) by reactive extrusion using a ¾" single screw Haake extruder attachment equipped with a strand die set to the following conditions:

Zone 1—140° C.

Zone 2—180° C.

Zone 3—205° C.

Adapter Zone 4—205° C.

Die Zone 5—205° C.

Screw Speed—40 rpm

DiCup™ R (100% active dicumyl peroxide available from Hercules Corporation) was dissolved in the liquid VTMS, and the resulting mixture was poured onto the polymer. The mixture was then absorbed into the polymer over the course of an hour before the polymer was fed to the Haake extruder reactor.

Table V reports in weight percent, based on the combined weight of the polymer, VTMS and peroxide, the relative amounts of polymer, VTMS and peroxide used to prepare silane-grafted polymers AA and BB; Table VI reports Formulations 6 and 7 prepared with silane-grafted polymers AA and BB (the formulations were prepared by the procedure described for Formulations 1–5); and Table VII reports the static compression set of foams K and L prepared from Formulations 6 and 7 using foam preparation method 2 (see the footnote to Table III marked with±). Foam A (made from Formulation 1 reported in Table I) reported in Table II is also reported in Table VII as a comparison. As this comparison demonstrates, the dual cured foams of this invention have superior static compression set properties relative to comparable single cured foams.

TABLE V

PREPARATION OF SILANE-GRAFTED POLYMERS AA AND BB

|  | Silane Grafted Olefinic Polymer AA | Silane Grafted Olefinic Polymer BB |
|---|---|---|
| Olefinic Polymer[1] | 99.5 | 98 |
| Silane[2] | 0.475 | 1.9 |
| Peroxide[3] | 0.025 | 0.1 |

[1]Engage ™ EG 8200, an ethylene/1-octene substantially linear homogeneous ethylene copolymer with a density of 0.870 g/cc and an $I_2$ of 5 g/10 min (ASTM D-1238, Condition E) manufactured by The Dow Chemical Company.
[2]Vinyl trimethoxy silane (VTMS), 98% active, available from Aldrich Chemical Company
[3]DiCup ™ R, 100% active dicumyl peroxide available from Hercules Corporation

TABLE VI

FORMULATIONS 6 AND 7

| Formulation (phr[1]) | 6 | 7 |
|---|---|---|
| Silane Grafted Olefinic Polymer AA | 100 | 0 |
| Silane Grafted Olefinic Polymer BB | 0 | 100 |
| Foaming Agent[2] | 4.5 | 4.5 |
| Foaming Agent Activator[3] | 1.35 | 1.35 |
| Internal Mold Release[4] | 0.5 | 0.5 |
| Peroxide[5] | 1.94 | 1.75 |
| Filler[6] | 5 | 5 |
| Coagent[7] | 2.5 | 2.5 |
| Pigment[8] | 3 | 3 |

TABLE VI-continued

FORMULATIONS 6 AND 7

| Formulation (phr[1]) | 6 | 7 |
|---|---|---|
| Antioxidant[9] | 0.1 | 0.1 |

[1]Parts per hundred resin
[2]Celogen ™ AZNP 130 available from Uniroyal Chemical Company
[3]Kadox ™ 911, a zinc oxide blowing agent activator available from C. P. Hall
[4]Zinc Stearate available from Witco Chemical Corp.
[5]DiCup ™ 40 KE, 40% active dicumyl peroxide on clay available from Hercules Corporation
[6]Atomite ™ $CaCO_3$ available from ECC International Ltd.
[7]Sartomer ™ 350 Monomer, a trimethylolpropane trimethacrylate crosslinking coagent available from Sartomer Company
[8]TiONA ™ RCL-4, a rutile chloride process titanium dioxide available from SCM Chemicals.
[9]Irganox ™ 1010, an antioxidant available from Ciba Geigy Corporation

TABLE VII

FOAM DENSITIES AND PERCENT STATIC COMPRESSION SET OF FOAMS K AND L PREPARED UNDER FOAM CONDITION 2*

| Foam | A | K | L |
|---|---|---|---|
| Foam Density (lb/ft$^3$) | 12.0 ± 0.5 | 12.5 ± 0.03 | 19.1 ± 0.0 |
| Static Compression Set Condition 1** | 81.5 ± 2.1 | 69.9 ± 3.4 | 43.3 ± 1.7 |
| Static Compression Set Condition 2± | 63.3 ± 2.4 | 31.6 ± 3.0 | 15.8 ± 1.7 |

*Foam condition 2 = 100 C. and 1 ton pressure for 20 min., then 175 C. and 25 tons pressure for 8 min.
**Static Compression Set Condition 1 = 60 C., 3 hours, 50% compression, 30 minute recovery
±Static Compression Set Condition 2 = Room temperature, 22 hours, 50% compression, 30 minute recovery Although the invention has been described in considerable detail through the preceding examples, this detail is for the purpose of illustration only. Many variations and modifications can be made by one skilled in the art without departing from the spirit and scope of the invention as described in the appended claims.

What is claimed is:

1. A dual cure process for producing a shaped, polyolefinic foamed article, the process comprising the steps of:
   A. compounding and simultaneously or subsequently shaping a composition consisting essentially of at least one olefinic polymer, selected from the group consisting of homogeneously branched linear or substantially linear ethylene copolymers, ethylene/vinyl acetate (EVA), ethylene/methacrylate, ethylene/acrylic acid (EAA), and diene containing polymers, bearing pendent, moisture-activated crosslinking functionality with at least one foaming agent and, optionally, at least one other component selected from the group consisting of curing agent, filler, foaming agent activator, free radical crosslinking coagent, sulfur crosslinking promotor, pigment, foam nucleator, antioxidant, process aid, ultraviolet light absorber, and flame retardant, to form a shaped, substantially uncrosslinked, foamed article precursor;
   B. performing a first stage cure on the precursor of Step A in such a manner that most of the pendent, moisture-activated crosslinking functionality remains unreacted;
   C. simultaneously with or subsequently to the first stage cure of Step B, foaming the precursor of Step A to form a shaped, partially cured, foamed article; and
   D. performing a second stage, post-foaming moisture-activated cure of the pendent crosslinking functionality of the shaped, partially cured, foamed article of Step C, to obtain a shaped foamed article having a gel level of at least 90% determined according to ASTM D-2765-84.

2. A dual cure process for producing a shaped, polyolefinic foamed article, the process comprising the steps of:
   A. compounding under nongrafting conditions (i) at least one olefinic polymer, (ii) at least one moisture-activated, crosslinking functionality capable of being grafted to the olefinic polymer to form an olefinic polymer with pendent, moisture-activated crosslinking functionality, (iii) at least one free radical initiator, (iv) at least one foaming agent, and optionally (v) at least one curing agent to form a substantially homogeneous, uncrosslinked foamed article precursor;
   B. shaping the precursor of Step A under grafting conditions such that the free radical initiator is activated and a shaped, substantially uncrosslinked olefinic polymer with pendent, moisture-activated crosslinking functionality is formed;
   C. simultaneously with Step B, performing a first stage cure of the olefinic polymer with pendent, moisture-activated crosslinking functionality in such a manner that most of the pendent, moisture-activated crosslinking functionality remains unreacted;
   D. simultaneously with the first stage cure of Step C, foaming the precursor of Step A to form a partially cured, foamed article; and
   E. performing a second stage, post-foaming moisture-activated cure of the pendent crosslinking functionality of the partially cured, foamed article of Step D, to obtain a shaped foamed article having a gel level of at least 90% determined according to ASTM D-2765-84.

3. The process of claim 1 or 2 in which the olefinic polymer is grafted with silane crosslinking functionality.

4. The process of claim 3 in which the silane crosslinking functionality is at lest one of vinyl trimethoxy silane and vinyl triethoxy silane.

5. The process of claim 4 in which the olefinic polymer is a copolymer or ethylene and an α-olefin of 3 to 20 carbon atoms.

6. The process of claim 5 in which the copolymer is a homogeneously branched substantially linear ethylene copolymer.

7. The process of claim 6 in which the optional curing agent is present, and it is a peroxide.

8. The process of claim 7 in which the peroxide curing agent has a half life of at least one hour at 120° C.

9. The process of claim 6 in which the optional curing agent is not present, and the precursor of Step A is cured by irradiation.

10. The process of claim 6 in which the precursor of Step A contains an accelerator for the second stage cure.

11. The process of claim 10 in which the accelerator is dibutyltin dilaurate.

12. The process according to claim 1 or 2 wherein the first stage cure is performed in such a manner that substantially all of the pendent, moisture-activated crosslinking functionality remains unreacted.

13. The process according to claim 1 or 2 wherein the shaped, partially cured, foamed article of Step C has a gel level from about 30 to about 70 percent measured according to ASTM D-2765-84.

14. The process according to claim 1 or 2 wherein the at least one olefinic polymer includes at least one homogeneously branched linear or substantially linear ethylene copolymer.

15. The process of according to claim 14 wherein the at least one homogeneously branched linear or substantially linear ethylene copolymer has a density (measured in accordance with ASTM D-792) in the range from about 0.85 to about 0.90 g/cm³ and a melt index (measured in accordance with ASTM D-1238 (190/2.16)) from about 0.1 to about 10 g/10 min.

16. The process of according to claim 14 wherein the first stage cure is effected by a heat-activated free radical initiator.

17. The process according to claim 1 or 2 wherein the at least one olefinic polymer includes EVA, ethylene methacrylate and/or EAA.

18. The process according to claim 1 or 3 wherein the at least one olefinic polymer includes at least one ethylene/propylene/diene terpolymer rubber.

19. The process according to claims 1 or 2 wherein the at least one olefinic polymer includes at least one functionalized ethylene copolymer.

20. A dual cure process for producing a shaped, polyolefinic foamed article, the process comprising the steps of:

A. compounding under nongrafting conditions (i) at least one olefinic polymer, (ii) at least one moisture-activated, crosslinking functionality capable of being grafted to the olefinic polymer to form an olefinic polymer with pendent, moisture-activated crosslinking functionality, (iii) at least one free radical initiator, (iv) at least one foaming agent, and optionally (v) at least one curing agent to form a substantially homogeneous, uncrosslinked foamed article precursor;

B. shaping the precursor of Step A under grafting conditions such that the free radical initiator is activated and a shaped, substantially uncrosslinked olefinic polymer with pendent, moisture-activated crosslinking functionality is formed;

C. simultaneously with or subsequent to Step B, performing a first stage cure of the olefinic polymer with pendent, moisture-activated crosslinking functionality in such a manner that most of the pendent, moisture-activated crosslinking functionality remains unreacted;

D. simultaneously with or subsequently to the first stage cure of Step C, foaming the precursor of Step A to form a partially cured, foamed article; and E. performing a second stage, post-foaming moisture-activated cure of the pendent crosslinking functionality of the partially cured, foamed article of Step D, to obtain a shaped foamed article having a gel level of at least 90% determined according to ASTM D-2765-84, wherein the at least one olefinic polymer includes at least one ethylene/propylene/diene terpolymer rubber.

* * * * *